United States Patent
Charbonnel et al.

(10) Patent No.: US 10,787,981 B2
(45) Date of Patent: Sep. 29, 2020

(54) POWER SYSTEM OPTIMIZATION

(71) Applicant: Caterpillar Inc., Deerfield, IL (US)

(72) Inventors: Sylvain Charbonnel, Peoria, IL (US); Fang Guo, Dunlap, IL (US); Anand Krishnamurthygopalan, Edwards, IL (US); Gavin Williams, Stamford (GB)

(73) Assignee: Caterpillar Inc., Peoria, IL (US)

( * ) Notice: Subject to any disclaimer, the term of this patent is extended or adjusted under 35 U.S.C. 154(b) by 46 days.

(21) Appl. No.: 16/058,890

(22) Filed: Aug. 8, 2018

(65) Prior Publication Data
US 2020/0049089 A1  Feb. 13, 2020

(51) Int. Cl.
*F02D 41/14* (2006.01)
*F01N 9/00* (2006.01)
(Continued)

(52) U.S. Cl.
CPC ......... *F02D 41/1406* (2013.01); *B60W 10/06* (2013.01); *B60W 20/15* (2016.01); *B60W 30/188* (2013.01); *F01N 9/005* (2013.01); *F02D 41/0007* (2013.01); *F02D 41/0077* (2013.01); *F02D 41/1462* (2013.01); *G05B 17/02* (2013.01); *B60W 2050/0014* (2013.01); *B60W 2530/12* (2013.01); *B60W 2556/00* (2020.02); *B60Y 2300/472* (2013.01);
(Continued)

(58) Field of Classification Search
CPC ............ F02D 41/1406; F02D 41/1462; F02D 41/401; F02D 41/402; F02D 41/3809; F02D 41/3082; G05B 17/02; B60W 10/06; B60W 30/188
See application file for complete search history.

(56) References Cited

U.S. PATENT DOCUMENTS

| 6,845,609 B2 | 1/2005 | Oguma |
| 6,941,219 B2 | 9/2005 | Avery, Jr. et al. |

(Continued)

FOREIGN PATENT DOCUMENTS

| CN | 102798530 B | 7/2015 |
| FR | 2929009 | 9/2009 |

(Continued)

*Primary Examiner* — Sizo B Vilakazi
*Assistant Examiner* — Anthony L Bacon
(74) *Attorney, Agent, or Firm* — Harrity & Harrity LLP (57) ABSTRACT

Power system optimization is disclosed. An example power system described herein may include an engine control module that receives measurements associated with sensors, identifies settings associated with control devices, determines that a first set of parameters associated with the one or more control devices is to be optimized according to a first optimization process, iteratively performs the first optimization process until the first set of parameters are optimized, determines that a second set of parameters associated with the one or more control devices are to be optimized according to a second optimization process, iteratively performs the second optimization process until the second set of parameters are optimized, and, after the second set of parameters are optimized according to the second optimization process, configures one of the control devices to operate using an optimized value for the control device determined using the second optimization process.

19 Claims, 3 Drawing Sheets

(51) Int. Cl.
*F02D 41/00* (2006.01)
*B60W 20/15* (2016.01)
*B60W 10/06* (2006.01)
*B60W 30/188* (2012.01)
*G05B 17/02* (2006.01)
*B60W 50/00* (2006.01)

(52) U.S. Cl.
CPC ... *B60Y 2300/476* (2013.01); *B60Y 2400/432* (2013.01); *B60Y 2400/442* (2013.01)

(56) References Cited

U.S. PATENT DOCUMENTS

| | | | |
|---|---|---|---|
| 7,047,125 | B1 | 5/2006 | He et al. |
| 7,107,142 | B2 | 9/2006 | Harada et al. |
| 9,103,248 | B2 | 8/2015 | Light-Holets |
| 9,146,545 | B2 | 9/2015 | Stewart |
| 9,546,612 | B2 | 1/2017 | Ge et al. |
| 9,764,812 | B1 | 9/2017 | Arbuckle et al. |
| 9,797,318 | B2 | 10/2017 | Storch et al. |
| 2007/0073467 | A1* | 3/2007 | Hill .................. F02D 35/02 701/105 |
| 2007/0203864 | A1* | 8/2007 | Grichnik .......... F02D 41/1462 706/44 |
| 2016/0011571 | A1* | 1/2016 | Mayr ................ G05B 17/02 700/29 |
| 2016/0144863 | A1 | 5/2016 | Bevan et al. |
| 2018/0058350 | A1* | 3/2018 | Zhu .................. F02B 17/005 |
| 2018/0209675 | A1* | 7/2018 | Ridder .............. F24F 11/62 |
| 2018/0274467 | A1* | 9/2018 | Garimella ......... F02D 41/0052 |
| 2018/0313285 | A1* | 11/2018 | Aso .................. F02D 41/1401 |
| 2019/0063353 | A1* | 2/2019 | Merlino ............ F02D 35/028 |
| 2019/0293013 | A1* | 9/2019 | Schaub ............. F02D 41/1406 |

FOREIGN PATENT DOCUMENTS

| | | |
|---|---|---|
| FR | 2926886 | 2/2010 |
| GB | 2460397 A | 12/2009 |
| WO | 1992009957 A1 | 6/1992 |
| WO | 2015130252 | 9/2015 |
| WO | 2017065753 | 4/2017 |

\* cited by examiner

POWER SYSTEM OPTIMIZATION

TECHNICAL FIELD

The present disclosure relates generally to power systems and, more particularly, to power system optimization.

BACKGROUND

Engine optimization involves configuring an engine to operate in an optimized manner according to an optimization process. For example, an engine may be configured by the optimization process to run as efficiently as possible, to run with the least amount of emissions, to run with the highest performance (e.g., speed output, torque output, and/or the like) and/or the like. An engine control module (ECM) may run the optimization process in real time and adjust one or more operation parameters according to the findings of the optimization process.

One attempt to perform engine optimization is disclosed in U.S. Patent Application Publication No. 2016/0144863 to Anderson, published on May 26, 2016 ("the Anderson reference"). In particular, the Anderson reference describes adaptive powertrain control for realizing an enhanced or optimized performance of one or more vehicle features. The Anderson reference describes monitoring vehicle performance, determining whether one of a plurality of vehicle performance features can be enhanced, and automatically making an adjustment to at least one identified operation parameter to enhance at least one aspect of the at least one performance feature. The performance feature may be fuel economy or urea consumption.

While the adaptive powertrain control of the Anderson reference may describe an optimization technique of adjusting an aspect of a performance feature, the Anderson reference does not disclose optimizing a variable number of parameters and/or variable sets of parameters during engine operation.

The power system optimizer of the present disclosure solves one or more of the problems set forth above and/or other problems in the art.

SUMMARY

According to some implementations, a device may include a memory and one or more processors to: identify a plurality of adjustable parameters to control a power system; identify a plurality of non-adjustable parameters associated with the power system; determine that a first set of adjustable parameters, of the plurality of adjustable parameters, is to be optimized according to a first optimization process; iteratively perform the first optimization process until the first set of adjustable parameters is optimized according to the first optimization process, wherein the first optimization process is performed based on values of the plurality of non-adjustable parameters; after the first set of adjustable parameters is optimized according to the first optimization process, select a second set of adjustable parameters, of the plurality of adjustable parameters, to be optimized according to a second optimization process; iteratively perform the second optimization process until the second set of adjustable parameters are optimized according to the second optimization process; and after the second set of adjustable parameters are optimized according to the second optimization process, configure a first control device, associated with a first adjustable parameter of the first set of adjustable parameters or a second adjustable parameter of the second set of adjustable parameters to use an optimized value determined for the first adjustable parameter using the first optimization process or an optimized value determined for the second adjustable parameter according to the second optimization process.

According to some implementations, a power system may include an engine; one or more control devices; one or more sensors; and an engine control module to: receive measurements associated with the one or more sensors; identify settings associated with the one or more control devices; determine that a first set of parameters associated with the one or more control devices is to be optimized according to a first optimization process; iteratively perform the first optimization process until the first set of parameters are optimized according to the first optimization process, wherein the first optimization process is performed based on the measurements associated with the one or more sensors; determine that a second set of parameters associated with the one or more control devices are to be optimized according to a second optimization process; iteratively perform the second optimization process until the second set of parameters are optimized according to the second optimization process, wherein the second optimization process is performed based on the measurements associated with the one or more sensors and a first setting for a first control device of the one or more control devices, wherein the first setting for the first control device is an optimized value determined using the first optimization process; and after the second set of parameters are optimized according to the second optimization process, configure a second control device to operate using an optimized value for the second control device determined using the second optimization process.

According to some implementations, a method may include identifying, by an engine control module, a first parameter, of a plurality of parameters, that is to be optimized during operation of an engine of a power system; selecting, by the engine control module, a first set of parameters to be optimized according to a first optimization process, wherein the first set of parameters includes the first parameter; iteratively performing, by the engine control module, the first optimization process until the first set of parameters is optimized; configuring, by the engine control module, a first control device to operate based on an optimized value, for at least one of the first set of parameters, determined using the first optimization process; after the first set of parameters is optimized, selecting, by the engine control module, a second set of parameters to be optimized according to a second optimization process, wherein the second set of parameters includes the first parameter; iteratively performing, by the engine control module, the second optimization process until the second set of parameters is optimized; and configuring, by the engine control module, a second control device to operate based on an optimized value, for at least one of the second set of parameters, determined using the second optimization process.

DETAILED DESCRIPTION

This disclosure relates to power system optimization using a power system optimizer of an engine control module (ECM). The power system optimizer, as described herein, has universal applicability to any machine utilizing such a power system optimizer. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other paving or underground mining equipment. Moreover, one or more implements may be connected to the machine and driven from the power system optimizer, as described herein.

Figure 1:
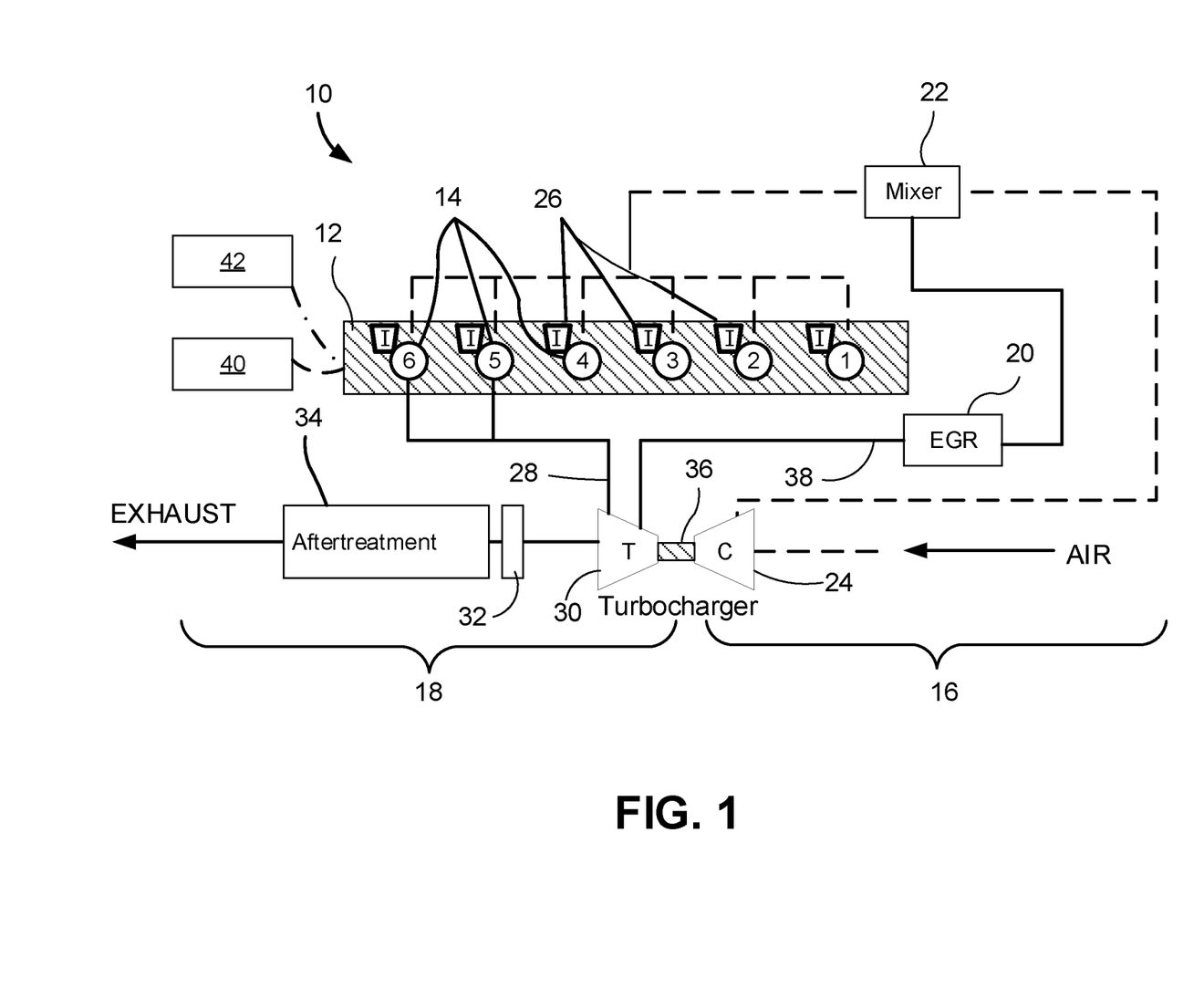
FIG. 1 is a diagram of an example power system described herein.

FIG. 1 is a diagram of an example power system 10 described herein. The power system 10 may be described herein as a compression ignition, internal combustion engine. However, the power system 10 may include any other type of internal combustion engine, such as, for example, a spark, laser, or plasma ignition engine. The power system 10 may be fueled by distillate diesel fuel, biodiesel, dimethyl ether, gaseous fuels, such as hydrogen, natural gas, propane, alcohol, ethanol, and/or any combination thereof.

Power system 10, of FIG. 1, includes an engine block 12 with a plurality of cylinders 14 (engine block 12 of FIG. 1 is shown with six cylinders 14). A piston assembly may be included within each of cylinders 14 to form a combustion chamber within each cylinder 14. Power system 10 may include any number of combustion chambers and the combustion chambers may be disposed in an in-line configuration, a "V" configuration, or in any other suitable configuration.

Power system 10 may include multiple systems. For example, as shown in the example of FIG. 1, power system 10 may include an air intake or air induction system 16, an exhaust system 18, and an exhaust gas recirculation (EGR) system 20. Air induction system 16 may be configured to direct air, or an air and fuel mixture (e.g., of air and another gas, such as exhaust gas) into power system 10 for subsequent combustion. Exhaust system 18 may exhaust or release byproducts of the combustion to an atmosphere external to power system 10. A recirculation loop of the EGR system 20 may be configured to direct a portion of the exhaust gases from exhaust system 18 back into air induction system 16 for subsequent combustion.

Air induction system 16 may include multiple components that cooperate to condition and introduce compressed air into cylinders 14. For example, air induction system 16 may include a mixer 22, or intake manifold, located downstream of one or more compressors 24. The air induction system 16 feeds variable valve actuators 26 associated with respective ones of cylinders 14. In some implementations, air induction system 16 may include a throttle valve, an air cooler, a filtering component, a compressor bypass component, and/or the like. As described herein, various controllable parameters associated with air induction system 16 may be optimized according to an optimization process. For example, an optimization process may be iteratively performed to optimize how compressed air is when the air enters a combustion chamber (e.g., by adjusting a setting of compressor 24), timing of the air as the air enters the combustion chamber (e.g., by adjusting opening and closing timing of variable valve actuators 26), an intake throttle valve position (e.g., by adjusting a position of an intake throttle valve of air induction system 16), and/or the like.

Exhaust system 18 may include multiple components that cooperate to condition and direct exhaust from cylinders 14 to the atmosphere. For example, exhaust system 18 may include an exhaust passageway 28, one or more turbines 30 driven by exhaust flowing through exhaust passageway 28, a particulate collection device 32, such as a diesel particulate filter (DPF) located downstream of turbine 30, and an exhaust aftertreatment device 34 (e.g., an aftertreatment selective catalytic reduction (SCR)) fluidly connected downstream of particulate collection device 32. In some implementations, exhaust system 18 may include one or more bypass components, an exhaust compression or restriction brake, an attenuation device, additional exhaust treatment devices, and/or the like.

Turbine 30 may be located to receive exhaust leaving power system 10, and may be connected to the one or more compressors 24 of air induction system 16 by way of a common shaft 36 to form a turbocharger. As exhaust gases exiting power system 10 flow through turbine 30 and expand against vanes thereof, turbine 30 may rotate and drive the one or more compressors 24 to pressurize inlet air.

In some implementations, particulate collection device 32 may be a DPF located downstream of turbine 30 to remove particulate matter from the exhaust flow of power system 10. In some implementations, particulate collection device 32 may include an electrically conductive or non-conductive coarse mesh metal or porous ceramic honeycomb medium. As the exhaust flows through the medium, particulates may be blocked by and trapped in the medium. Over time, the particulates may build up within the medium and, if unaccounted for, could affect engine performance by increasing exhaust backpressure. To minimize backpressure effects on engine performance, the collected particulates may be passively and/or actively removed through a regeneration process. When passively regenerated, the particulates deposited on the medium may chemically react with a catalyst, for example, a base metal oxide, a molten salt, and/or a precious metal that is coated on or otherwise included within particulate collection device 32 to lower the ignition temperature of the particulates. Because particulate collection device 32 may be closely located downstream of engine block 12 (e.g., immediately downstream of turbine 30, in one example), the temperatures of the exhaust flow entering particulate collection device 32 may be controlled to be high enough, in combination with the catalyst, to burn away the trapped particulates. When actively regenerated, heat is applied to the particulates deposited on the filtering medium to elevate the temperature thereof to an ignition threshold. In accordance with yet other implementations described herein, an active regeneration device (not shown), such as a fuel-fired burner or an electric heater, may be located proximal (e.g., upstream of) particulate collection device 32 to assist in controlling the regeneration of the particulate collection device 32. A combination of passive and active regeneration may be utilized, if desired.

Exhaust aftertreatment device 34 may receive exhaust from turbine 30 and trap or convert particular constituents in the gas stream. In one example, exhaust aftertreatment device 34 may embody a selective catalytic reduction (SCR) device having a catalyst substrate located downstream from a reductant injector. A gaseous or liquid reductant, most commonly urea or a water and urea mixture may be sprayed or otherwise advanced into the exhaust upstream of catalyst substrate by a reductant injector. As the reductant is absorbed onto the surface of catalyst substrate, the reductant may react with NOx (NO and NO2) in the exhaust gas to form water (H2O) and elemental nitrogen (N2). In some embodiments, a hydrolysis catalyst may be associated with catalyst substrate to promote even distribution and conversion of urea to ammonia (NH3).

In accordance with other implementations of the present disclosure, the reduction process may also include an oxidation catalyst, which, for example, may include a porous ceramic honeycomb structure or a metal mesh substrate coated with a material, for example a precious metal, that catalyzes a chemical reaction to alter the composition of the exhaust. For example, the oxidation catalyst may include platinum that facilitates the conversion of NO to NO2, and/or vanadium that suppresses the conversion.

The exhaust aftertreatment device 34 may require desulphation to maintain an acceptable NOx conversion rate. Similar to a regeneration event of the particulate collection device 32, the desulphation event may require increased exhaust temperatures. Decoupling an intake valve actuation (IVA) control from the EGR control during desulphation, for example, may provide enhanced capability for thermal management of the exhaust during such maintenance events.

As described herein, various controllable parameters associated with exhaust system 18 may be optimized according to an optimization process. For example, an optimization process may be iteratively performed to optimize an open area of an exhaust backpressure valve (e.g., by adjusting a position of a backpressure valve of exhaust system 18), a mass flow through particulate collection device 32 (e.g., by performing active and/or passive regeneration via particulate collection device 32), a pressure of the exhaust gases (e.g., by adjusting a temperature and/or a pressure in the exhaust downstream from turbine 30), and/or the like.

EGR system 20 may redirect gases from exhaust system 18 back into air induction system 16 for subsequent combustion. EGR is a process whereby exhaust gas from the engine is recirculated back into air induction system 16 for subsequent combustion. The recirculated exhaust gases may reduce the concentration of oxygen within the combustion chambers, and simultaneously lower the maximum combustion temperature therein. The reduced oxygen levels may provide fewer opportunities for chemical reaction with the nitrogen present, and the lower temperature may slow the chemical process that results in the formation of NOx. As mentioned above, a cooler may be included to cool the exhaust gases before the gases are combusted.

When utilizing EGR in a turbocharged diesel engine, as shown in FIG. 1, the exhaust gas to be recirculated may be removed upstream of the exhaust gas driven turbine 30 associated with the turbocharger. For example, in many EGR applications, the exhaust gas may be diverted from the exhaust passageway 28 and diverted via an EGR conduit 38 to air induction system 16. Likewise, the recirculated exhaust gas may be re-introduced to the air induction system 16 downstream of the compressor 24. In some implementations, EGR system 20 may be an external EGR system and/or may include various features for implementation of the methods described herein, such as a system of primary control and bypass valves to allow an engine control module (ECM) 40 to control various flows through the EGR system during selected engine operating conditions.

As described herein, various controllable parameters associated with EGR system 20 may be optimized according to an optimization process. For example, an optimization process may be iteratively performed to optimize a mass flow of exhaust gas through EGR system 20 (e.g., by adjusting an EGR bypass valve and/or the like connected to EGR conduit 38), and/or the like.

Power system 10 of FIG. 1 includes an ECM 40. The ECM 40, as described herein, provides control of power system 10 in order to optimize a plurality of adjustable parameters of power system 10 based on engine operating conditions as indicated by a sensor system 42. ECM 40 is implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, or a combination of hardware and software. In some implementations, ECM 40 includes one or more processors capable of being programmed to perform a function. In some implementations, one or more memories, including a random access memory (RAM), a read only memory (ROM), and/or another type of dynamic or static storage device (e.g., a flash memory, a magnetic memory, and/or an optical memory) may store information and/or instructions for use by ECM 40. In some implementations, ECM 40 may include a memory (e.g., a non-transitory computer-readable medium) capable of storing instructions, that when executed, cause the processor to perform one or more processes and/or methods described herein.

ECM 40 may execute the instructions to perform various control functions and processes to control power system 10 and to automatically adjust adjustable parameters of power system 10. ECM 40 may include any appropriate type of engine control system configured to perform engine control functions such that power system 10 may operate properly. Further, ECM 40 may also control another system of a vehicle or machine, such as a transmission system, a hydraulics system, and/or the like.

Sensor system 42 may provide measurements associated with various parameters used by ECM 40 to control power system 10 and/or to determine optimized values for one or more adjustable parameters of power system 10. Sensor system 42 may include physical sensors and/or any appropriate type of control system that generates values of sensing parameters based on a computational model and/or one or more measured parameters. As used herein, sensing parameters may refer to those measurement parameters that are directly measured and/or estimated by one or more sensors (e.g., physical sensors, virtual sensors, and/or the like). Example sensors may include temperature sensors, speed sensors, chemical composition sensors (e.g., a NOx emission sensor), pressure sensors, and/or the like. Sensing parameters may also include any output parameters that may be measured indirectly by physical sensors and/or calculated based on readings of physical sensors. Measurements from the sensing parameters, as used herein, may refer to any values relevant to the sensing parameters and indicative of the state of the power system 10. For example, measurements may include machine and environmental parameters, such as compression ratios, turbocharger efficiency, aftercooler characteristics, temperature values, pressure values, ambient conditions, fuel rates, engine speeds, and/or the like. Measurements may be included as inputs to be provided to one or more virtual sensors.

Sensor system 42 may be configured to coincide with ECM 40, may be configured as a separate control system, and/or may be configured as a part of other control systems. Further, ECM 40 may implement the sensor system 42 by using computer software, hardware, or a combination of software and hardware. For example, ECM 40 may execute instructions to cause sensors of sensor system 42 to sense and/or generate values of sensing parameters based on a computational model and other parameters.

In operation, computer software instructions may be stored in or loaded to ECM 40. ECM 40 may execute the computer software instructions to perform various control functions and processes to control power system 10 and to automatically adjust engine operational parameters, such as fuel injection timing and fuel injection pressure, one or more operational temperatures, one or more mass flows, and/or the like. Additionally, or alternatively, ECM 40 may execute computer software instructions to generate and/or operate sensor system 42 to provide engine temperature values, engine pressure values, engine emission values, engine speed values, actuator or valve position values, and/or other parameter values used to monitor and/or control power system 10.

The ECM 40 may also identify, obtain, and/or determine parameters that are associated with conditions (e.g., as sensed by sensor system 42) or settings corresponding to the operations of power system 10, such as engine speed, fuel rate or quantity, injection timing, intake manifold temperature (IMAT), intake manifold pressure (IMAP), intake valve actuation (IVA) end of current, IVA timing, intake throttle valve position, injection air pressure, injection fuel pressure, torque delivered by the engine, total fuel injection quantity, exhaust pressure, number of cylinders 14 firing, oxygen/fuel molar ratio, ambient temperature, ambient pressure (e.g., barometric pressure), mass flow through particulate collection device 32, exhaust backpressure valve position, shot mode, coolant temperature, total induction mass flow in multi-shot mode, dwell (e.g., length of time between shots) in multi-shot mode, and/or the like. The non-adjustable parameters may be measured by certain physical sensors, such as a high precision lab grade physical sensor, or created by other control systems.

As indicated above, FIG. 1 is provided as an example. Other examples are possible and may differ from what was described in connection with FIG. 1.

Figure 2:
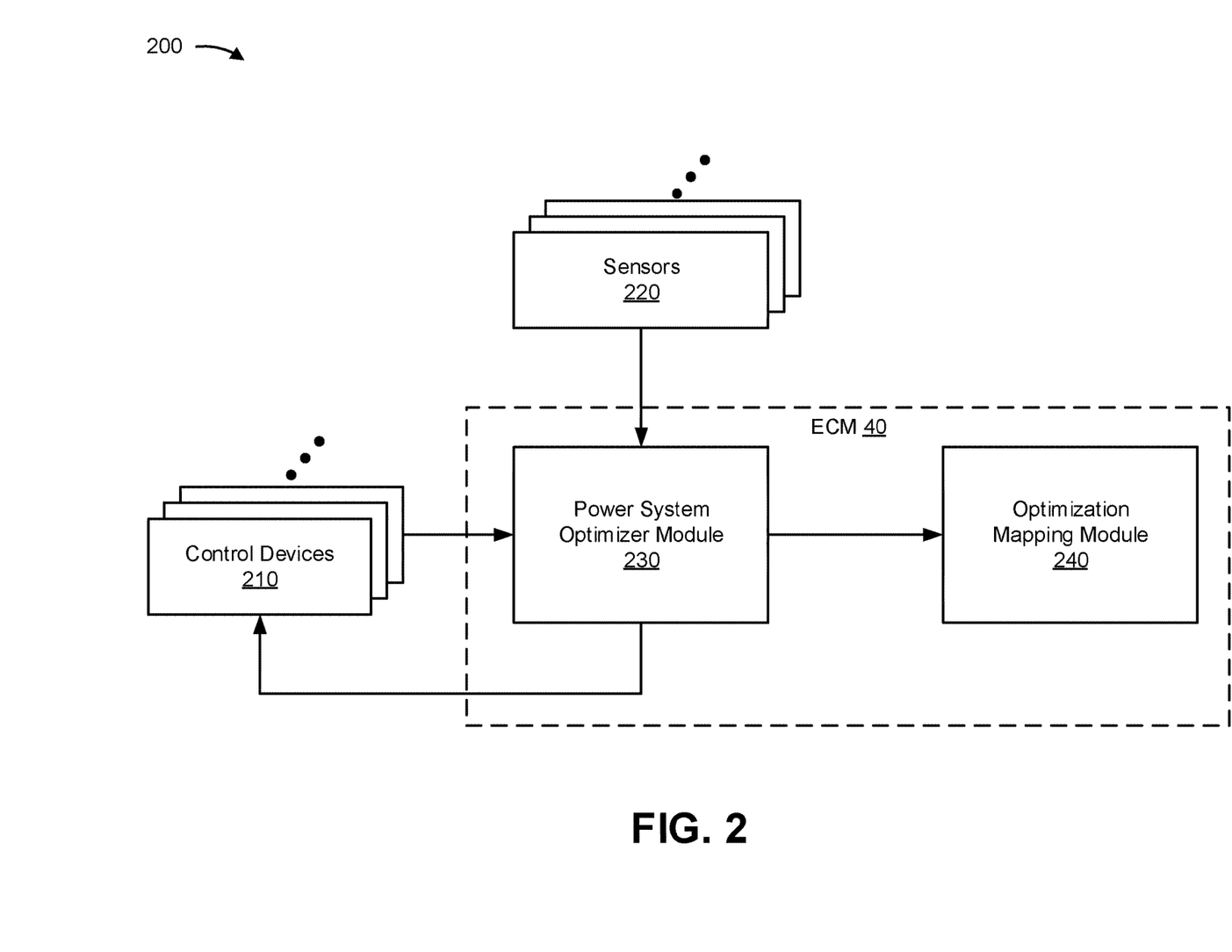
FIG. 2 is a diagram of an example optimization system that may be included within the power system of FIG. 1, as described herein.

FIG. 2 is a diagram of an example optimization system 200 in which systems and/or methods, described herein, may be implemented. As shown in FIG. 2, optimization system 200 may include one or more control devices 210 (referred to individually as "control device 210" and collectively as "control devices 210"), one or more sensors 220 (referred to individually as "sensor 220" and collectively as "sensors 220"), and ECM 40. As shown in FIG. 2, ECM 40 may include power system optimizer module 230 and an optimization mapping module 240. ECM 40 of FIG. 2 may correspond to ECM 40 of FIG. 1. Devices and/or components of optimization system 200 may interconnect via wired connections, wireless connections, or a combination of wired and wireless connections.

Control device 210 may be any type of device that may be used by ECM 40 to control a performance feature of power system 10. For example, control device 210 may include one or more actuators, switches, and/or the like that are capable of opening and/or closing a valve within power system 10, adjusting a temperature within power system 10 (e.g., using a fan, a cooling system, and/or the like), adjusting a pressure within power system 10, and/or the like.

Control device 210 may be associated with an adjustable parameter that may be optimized via an optimization process, as described herein. For example, a value of the adjustable parameter for control device 210 may represent or indicate a setting of the control device 210, such as a position of an actuator, a length of time that a valve is open, a position of the valve, a temperature at which to operate, a pressure at which to compress air and/or fuel, and/or the like.

Sensors 220 may include any type of sensor configured to measure operating conditions of power system 10. Sensors 220 may be sensors of sensor system 42, as described herein. For example, the sensors 220 may include temperature sensors (e.g., to detect temperature of air, exhaust, a component, coolant, and/or the like), position sensors (e.g., to detect a position of a valve, an actuator, an engine part (e.g., a piston), and/or the like), speed sensors (e.g., to detect an engine speed, a machine speed, and/or the like), pressure sensors (e.g., to detect a measure of compression of air or exhaust in power system 10), emissions sensors (e.g., to detect emission levels of power system 10), and/or the like.

Sensor 220 may be associated with a sensing parameter that may be used in optimizing values for adjustable parameters of control devices 210 via an optimization process, as described herein. For example, a value of the sensing parameter for sensor 220 may represent or indicate a measurement of the sensor 220, such as a measured temperature of a temperature sensor, a measured timing of a valve opening and/or closing by a position sensor, a measured speed of an engine by a speed sensor, a measured position of an actuator by a position sensor, measured emissions by an emissions sensor, and/or the like.

Power system optimizer module 230 may include one or more devices configured to perform an optimization process to identify optimized operational settings for control devices 210 as described herein. As shown, power system optimizer module 230 may be included within and/or implemented by ECM 40. Power system optimizer module 230 may be configured via a user interface and/or default settings to identify adjustable parameters of power system 10 and optimize values for various sets or various numbers of adjustable parameters of power system 10 using one or more optimization processes. For example, in some implementations, a user and/or manufacturer (e.g., a manufacturer of power system 10) may configure power system optimizer module 230 to optimize multiple sets of adjustable parameters of power system 10 via optimization processes, as described herein.

Power system optimizer module 230, according to some implementations described herein, is configured to identify a plurality of adjustable parameters to control power system 10. For example, power system optimizer module 230 may identify the plurality of adjustable parameters based on which control devices 210 are included within optimization system 200 and/or which control devices 210 are configurable via ECM 40. Additionally, or alternatively, power system optimizer module 230 may identify a plurality of sensing parameters (e.g., non-adjustable parameters) associated with power system 10. For example, power system optimizer module 230 may identify the plurality of sensing parameters based on which sensors 220 are included within optimization system 200 and/or which sensors 220 provide measurements to ECM 40.

In some implementations, power system optimizer module 230 determines that a set of adjustable parameters is to be optimized according to an optimization process. The set of adjustable parameters may include one or more parameters of the plurality of adjustable parameters that are associated with one or more control devices 210. The set of adjustable parameters may be designated for optimization according to a configuration of optimization system 200, as provided by a user and/or a manufacturer. For example, a user and/or manufacturer may designate one or more adjustable parameters to be optimized during operation of power system 10. In such cases, the user and/or manufacturer may assign an optimization characteristic (e.g., a flag and/or identifier indicating that the adjustable parameter is to be optimized) to the adjustable parameters indicating that the adjustable parameters are to be optimized during operation and/or at particular times relative to other adjustable parameters (e.g., after one or more adjustable parameters are optimized).

In some implementations, the user and/or manufacturer may indicate a priority of optimizing the adjustable parameters. For example, the optimization characteristic may indicate different priorities of when or how the adjustable parameter is to be optimized. In some implementations, the adjustable parameters may be assigned to tiers. For example, first tier adjustable parameters may be optimized according to a first optimization process, second tier adjustable parameters may be optimized according to a second optimization process that takes place after the first optimization process, third tier adjustable parameters may be optimized according to a third optimization process that takes place after the second optimization process, and so on. In some implementations, an optimization characteristic may indicate that one or more adjustable parameters are to always be optimized. In such cases, the one or more adjustable parameters may be included in all sets of adjustable parameters that are optimized according to the different optimization processes (e.g., the first, second, and third optimization processes).

As a specific example, a first identifier (e.g., which can be represented by a "1" or similar priority indicating identifier) can be assigned to designate first tier adjustable parameters that are to always be optimized, a second identifier (e.g., which can be represented by a "2" or similar priority indicating identifier) can be assigned to designate second tier adjustable parameters that are to be optimized via an initial optimization process with the first tier adjustable parameters, and a third identifier (e.g., which can be represented by a "3" or similar priority indicating identifier) can be assigned to designate third tier adjustable parameters that may be optimized after the initial optimization process along with the first tier adjustable parameters and/or the third tier adjustable parameters.

According to some implementations, the first tier of adjustable parameters are to always be optimized, the second tier of adjustable parameters are to be optimized along with the first tier of adjustable parameters using a first optimization process (e.g., to find the optimized value of the first tier of adjustable parameters while optimizing the second tier of adjustable parameters), and the third tier of adjustable parameters may be optimized, once the optimized values for the first tier of adjustable parameters and the second tier of adjustable parameters are found, using a second optimization process. As an example, a first tier of adjustable parameters may include total fuel quantity injected into the combustion chamber; a second tier of adjustable parameters may include timing of injecting the fuel (e.g., a unit of degrees from top dead center of cylinders 14) and EGR mass flow; and a third tier of adjustable parameters may include an air pressure of air when injected into the combustion chamber, a fuel pressure of fuel when injected into the combustion chamber, a temperature at an outlet of an air cooler of air induction system 16, a number of cylinders 14 that are to fire, and a shot mode corresponding to a number of shots (injections) of fuel per revolution of the pistons of the cylinders 14. In such an example, the total fuel quantity injected, the timing of injecting the fuel, and the EGR mass flow may be optimized via a first optimization process. For a second, subsequent optimization process, power system optimizer module 230 may optimize the total fuel quantity injected and select (e.g., randomly, semi-randomly, and/or according to a priority) a set of parameters (e.g., a threshold number of parameters) that are to be optimized from the timing of injecting the fuel, EGR mass flow, air pressure, fuel pressure, temperature at the outlet of the air cooler, number of cylinders 14 that are to fire, and/or shot mode.

In some implementations, power system optimizer module 230 may select adjustable parameters that are to be optimized from a set of adjustable parameters that are designated to be optimized. For example, power system optimizer module 230 may be configured to optimize a maximum of a threshold number (e.g., four or less) of parameters using a single optimization process. Therefore, if power system optimizer module 230 determines that more than the threshold number of adjustable parameters are to be optimized according to a particular priority or tier of the adjustable parameters, power system optimizer module 230 may select the threshold number of adjustable parameters to be the set of adjustable parameters that are to be optimized. Power system optimizer module 230 may select the set of adjustable parameters randomly and/or according to one or more priority characteristics associated with each of the adjustable parameters. In some implementations, each time that parameters are to be selected for optimization, a same selection process can be used to select the parameters. For example, each selection can be random, semi-random, and/or selected according to a same priority scheme. In some implementations, each time that parameters are to be selected for optimization, a same selection process or a different selection process can be used to select the parameters.

The optimization process performed by power system optimizer module 230 may be any suitable optimization process that calculates optimization values for an adjustable parameter based on the values of other remaining adjustable parameters associated with control devices 210 and values of sensing parameters associated with sensors 220. For example, the optimization process may include a process that adjusts one or more values of the adjustable parameters until an optimized value for the adjustable parameter is found. The optimization process may include a semi-random assignment of values for the adjustable parameters (e.g., using a gradient based optimization method, a non-gradient based optimization method, a combination of a gradient based optimization method and non-gradient based optimization method, and/or the like), a model that calculates the performance of the engine of power system 10 with settings and/or measurements from the control devices 210 and sensors 220, and/or a cost function that defines a best performance for the engine of power system 10 (e.g., based on a weighting factor, performance, constraints, and/or the like).

Using the optimization process, the power system optimizer module 230 may find an optimized value for an adjustable parameter of a control device 210 by finding a minimum cost function value (according to particular weights of the cost function for particular parameters) achieved according to an optimization process using settings of control devices 210 and/or the operating conditions as sensed by sensors 220.

In some implementations, the ECM 40 may have a designated set of resources to run the power system optimizer module 230 to determine optimization values for optimization system 200. For example, to perform an optimization process, the ECM 40 may only be able to iteratively make a threshold number of calculations of the optimization process within a particular period of time. For example, the ECM 40 may be configured to optimize settings of one or more control devices every threshold period of time (e.g., every 60 milliseconds (ms), every 120 ms, every 400 ms, and/or the like). Accordingly, as an example, ECM 40 may perform an optimization process every 400 ms, allowing a threshold number of calculations (e.g., 200 calculations, 400 calculations, 1000 calculations, and/or the like based on converging adjustments to values of the parameters that are to be optimized) to be made during that time period to perform the optimization process to optimize corresponding performance features of power system 10 (e.g., by adjusting settings of control devices 210 to optimized values found by performing the optimization process). Therefore, the greater the number of adjustable parameters that are to be adjusted during a given optimization process, the less dense the sample for optimizing each adjustable parameter, and the less likely that an identified optimized value, for each of the adjustable parameters that are being optimized, is possible. Accordingly, power system optimizer module 230 iteratively performs the optimization process for the threshold number adjustable parameters (e.g., to optimize a limited number (e.g., four or less) rather than all parameters every 400 ms) before attempting to optimize additional parameters.

Therefore, according to some implementations, power system optimizer module 230 may iteratively perform an optimization process until the set of adjustable parameters is optimized according to the optimization process. The set of adjustable parameters may be optimized according to the optimization process once all parameters of the set of adjustable parameters are optimized, once a threshold number of parameters of the set of adjustable parameters are optimized, once a threshold percentage of the set of adjustable parameters are optimized, once at least a particular parameter, in the set of adjustable parameters, is optimized, and/or the like. Furthermore, the set of adjustable parameters may be optimized according to the optimization process after a threshold number of iterations (e.g., three iterations, five iterations, and/or the like) of performing the optimization process result in the same or similar (e.g., within a tolerance) corresponding values for all parameters of the set of adjustable parameters, for a threshold number of parameters of the set of adjustable parameters, for a threshold percentage of the set of adjustable parameters, for at least a particular parameter in the set of adjustable parameters, and/or the like.

Referring back to the example above, power system optimizer module 230 may iteratively make 1000 calculations, every 400 ms, using values of the sensing parameters, current settings or null values for adjustable parameters that are not being optimized, and adjusted values (e.g., randomly adjusted, and/or semi-randomly adjusted) for each calculation according to results of previous calculations, until the optimization process repeatedly finds the same optimized values for the adjustable parameters that are to be optimized for that set of adjustable parameters. For example, after three iterations of an optimization process, five iterations of the optimization process, and/or the like, power system optimizer module 230 may determine that the optimized values for the adjustable parameters have been found by that optimization process. In some implementations, the number of iterations to determine that the optimization has been found may be based on the optimization process that is being performed. For example, an initial optimization process to optimize a first set of adjustable parameters may require at least five iterations of the initial optimization process to find the same values for the first set of adjustable parameters to determine those same values are optimized values for the first set of adjustable parameters according to the initial optimization process. Additionally, or alternatively, a subsequent optimization process to optimize a second set of adjustable parameters may require more iterations and/or fewer iterations (e.g., four iterations or less) of the subsequent optimization process to find the same values for the set of adjustable parameters to determine those same values are optimized values for the second set of adjustable parameters according to the subsequent optimization process. Therefore, if power system optimizer module 230 determines that a same value is found for a set of adjustable parameters that are to be optimized after a threshold number of iterations of the optimization process (e.g., after three or more iterations of the optimization process), power system optimizer module 230 may determine that the optimized values for the set of adjustable parameters has been found.

Once optimized values are found or determined for the set of adjustable parameters that are to be optimized, power system optimizer module 230 may select a subsequent set of adjustable parameters of the plurality of adjustable parameters to be optimized according to a subsequent optimization process. The subsequent optimization process may be the same type of optimization process as previously performed (e.g., 1000 calculations every 400 ms, 200 calculations every 60 ms, and/or the like) or a different type of optimization process that optimized values for one or more adjustable parameters that have been optimized according to the previous optimization process, according to measured values for sensing parameters of sensors 220, according to current settings for adjustable parameters of control devices 210 that are not being optimized, and according to adjusted values for adjustable parameters of control devices 210 that are to be optimized. Power system optimizer module 230 may iteratively perform the subsequent optimization process until the subsequent set of parameters are optimized according to the second optimization process. In some implementations, the previously optimized parameters may remain optimized because optimized values are set (e.g., according to optimization mapping module 240) for those parameters during the iterative performance of the second optimization process. Additionally, or alternatively, one or more parameters that were optimized by the previous optimization process may again be designated or selected to be optimized during the subsequent optimization process. Furthermore, it is noted, that once all parameters, a threshold number of parameters, a threshold percentage of parameters, a particular parameter, and/or the like of the subsequent set of parameters that are to be optimized are optimized, power system optimizer module 230 may select a third set of parameters that are to be optimized, and a third optimization process can similarly be iteratively performed, and so on. In such cases, the optimization processes may be a same type of optimization process. For example, the optimization processes may use a same type of sampling, a same number of samples, a same type of execution process (e.g., a same type of algorithm), and/or the like. Additionally, or alternatively, the optimization process may use different optimization processes when optimizing different sets of optimization parameters. In such cases, the optimization process may use a different type of sampling, a different number of samples, a different type of execution process, and/or the like.

Once optimized values are found (e.g., after the optimization process finds a same optimized value after a threshold number of iterations of executing the optimization process), power system optimizer module 230 may set optimization values (e.g., in optimization mapping module 240) for the adjustable parameters that were optimized according to the optimization process. Accordingly, using the example described above, after optimized values are found following iterative executions of an initial optimization process, the optimization values may be set for the set of adjustable parameters that were optimized by the initial optimization process in optimization mapping module 240. Furthermore, after the set of adjustable parameters and the subsequent set of adjustable parameters are optimized following iteratively performing the subsequent optimization process, the optimization values may be set in the optimization mapping module 240.

Optimization mapping module 240 may be any suitable data structure (e.g., a database, a table, an index, a graph, and/or the like) that may store optimization values for adjustable parameters associated with control devices 210. In some implementations, power system optimizer module 230 may obtain and/or use optimization values in optimization mapping module 240 to perform optimization processes as described herein. For example, optimization values in the optimization mapping module 240 may be used as input values for one or more adjustable parameters for the control devices when performing an optimization process.

In some implementations, optimization mapping module 240 includes a plurality of tables, mappings, and/or the like that correspond to a variety of measurements associated with sensors 220 and/or settings associated with control devices 210. Accordingly, depending on the environmental characteristics of power system 10, different mappings may be used to perform an optimization process.

According to some implementations, power system optimizer module 230 may update optimization values for an adjustable parameter when an optimization process finds an optimization value for the adjustable parameter that is less than or greater than the optimization value in the optimization mapping (depending on whether the adjustable parameter has a minimum optimized value or a maximum optimized value). Therefore, optimization mapping module 240 may be dynamically updated after each optimization process is executed and/or after a threshold number of iterations finds same values for adjustable parameters that are to be optimized according to the optimization process.

In some implementations, ECM 40 may use optimization values in optimization mapping module 240 to configure settings of control device 210 during operation of optimization system 200 and/or power system 10. For example, ECM 40 may instruct control devices 210 to adjust settings of the control devices 210 to use the optimization settings. Accordingly, ECM 40 may dynamically configure control device 210 to be set to optimize performance of power system 10.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of optimization system 200 may perform one or more functions described as being performed by another set of devices of optimization system 200.

Figure 3:
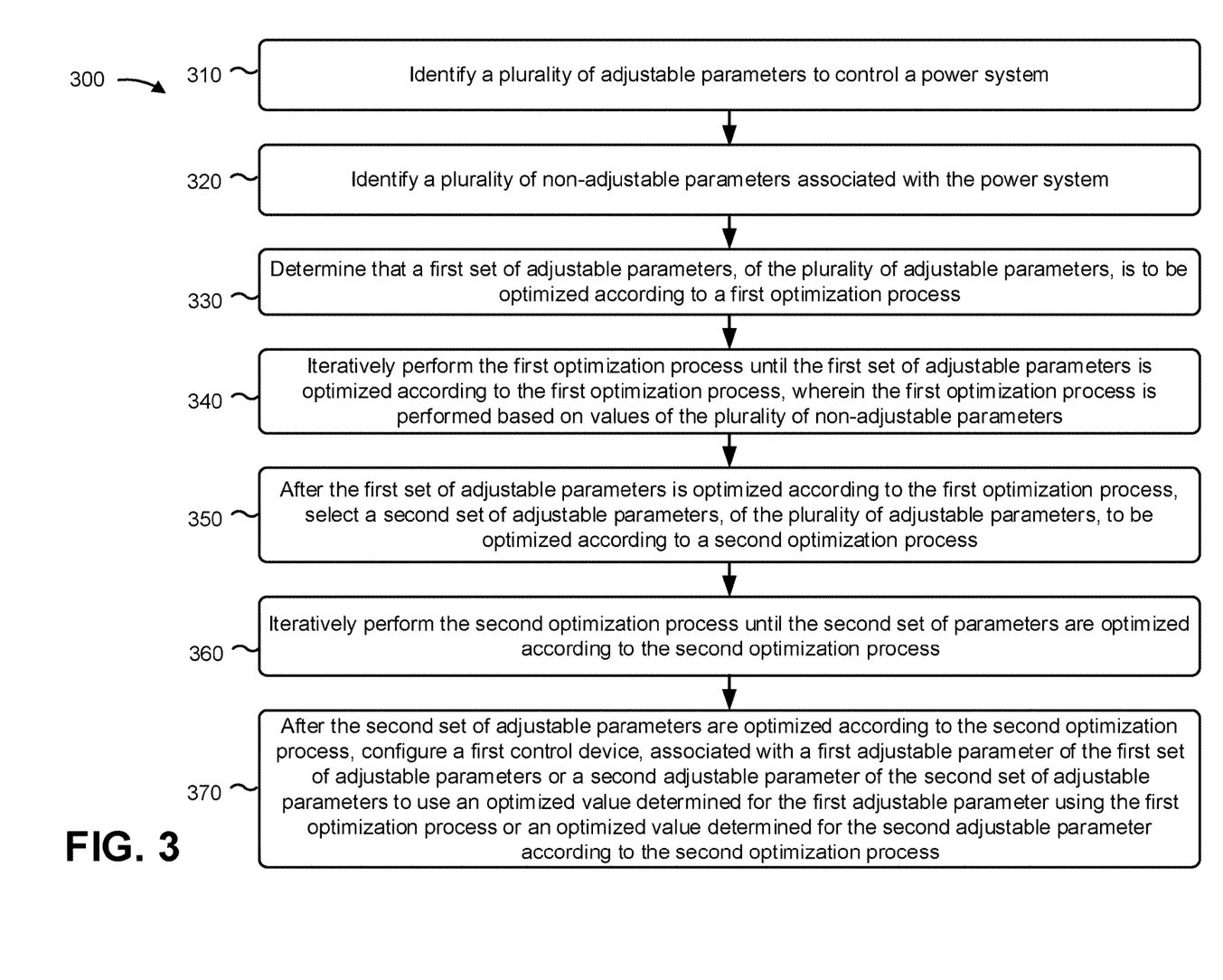
FIG. 3 is a flow chart of an example process associated with power system optimization.

FIG. 3 is a flow chart of an example process 300 associated with power system optimization. In some implementations, one or more process blocks of FIG. 3 may be performed by an ECM (e.g., ECM 40 using power system optimizer module 230 and/or optimization mapping module 240). In some implementations, one or more process blocks of FIG. 3 may be performed by another device or a group of devices separate from or including the ECM, such as control devices (e.g., control devices 210) and/or sensors (e.g., sensors 220) of a system (e.g., power system 10 and/or optimization system 200).

As shown in FIG. 3, process 300 may include identifying a plurality of adjustable parameters to control a power system (block 310). For example, the ECM (e.g., using power system optimizer module 230) may identify a plurality of adjustable parameters to control power to a power system, as described above.

As further shown in FIG. 3, process 300 may include identifying a plurality of non-adjustable parameters associated with the power system (block 320). For example, the ECM (e.g., using power system optimizer module 230) may identify a plurality of non-adjustable parameters associated with the power system, as described above.

As further shown in FIG. 3, process 300 may include determining that a first set of adjustable parameters, of the plurality of adjustable parameters, is to be optimized according to a first optimization process (block 330). For example, the ECM (e.g., using power system optimizer module 230) may determine that a first set of adjustable parameters, of the plurality of adjustable parameters, is to be optimized according to a first optimization process, as described above.

As further shown in FIG. 3, process 300 may include iteratively performing the first optimization process until the first set of adjustable parameters is optimized according to the first optimization process, wherein the first optimization process is performed based on values of the plurality of non-adjustable parameters (block 340). For example, the ECM (e.g., using power system optimizer module 230 and/or optimization mapping module 240) iteratively perform the first optimization process until the first set of adjustable parameters is optimized according to the first optimization process, as described above. In some implementations, the first optimization process is performed based on values of the plurality of non-adjustable parameters.

As further shown in FIG. 3, process 300 may include, after the first set of adjustable parameters is optimized according to the first optimization process, select a second set of adjustable parameters, of the plurality of adjustable parameters, to be optimized according to a second optimization process (block 350). For example, after the first set of adjustable parameters is optimized according to the first optimization process, the ECM (e.g., using power system optimizer module 230) may select a second set of adjustable parameters, of the plurality of adjustable parameters, to be optimized according to a second optimization process, as described above.

As further shown in FIG. 3, process 300 may include iteratively performing the second optimization process until the second set of parameters are optimized according to the second optimization process (block 360). For example, the ECM (e.g., using power system optimizer module 230 and/or optimization mapping module 240) may iteratively perform the second optimization process until the second set of parameters are optimized according to the second optimization process, as described above.

As further shown in FIG. 3, process 300 may include, after the second set of adjustable parameters are optimized according to the second optimization process, configuring a first control device, associated with a first adjustable parameter of the first set of adjustable parameters or a second adjustable parameter of the second set of adjustable parameters to use an optimized value determined for the first adjustable parameter using the first optimization process or an optimized value determined for the second adjustable parameter according to the second optimization process (block 370). For example, after the second set of adjustable parameters are optimized according to the second optimization process, the ECM (e.g., using power system optimizer module 230 and/or optimization mapping module 240) may configure a first control device, associated with a first adjustable parameter of the first set of adjustable parameters or a second adjustable parameter of the second set of adjustable parameters to use an optimized value determined for the first adjustable parameter using the first optimization process or an optimized value determined for the second adjustable parameter according to the second optimization process, as described above.

Process 300 may include additional implementations, such as any single implementation or any combination of implementations described below and/or in connection with one or more other processes described elsewhere herein.

In some implementations, the plurality of adjustable parameters are settings for corresponding control devices of the power system and the plurality of non-adjustable parameters correspond to measurements of one or more sensors of the power system. In some implementations, the one or more processors are to determine that the first set of adjustable parameters are to be optimized based on optimization characteristics of the first set of adjustable parameters.

In some implementations, each iteration of the first optimization process includes iteratively adjusting values of the first set of adjustable parameters to identify the optimized value determined for the first adjustable parameter using the first optimization process. In some implementations, each iteration of the second optimization process includes iteratively adjusting values of the second set of adjustable parameters to identify the optimized value determined for the second adjustable parameter using the second optimization process. In some implementations, the optimized value determined for the second adjustable parameter using the second optimization process comprises a minimum cost function value for the second optimization process.

In some implementations, after each iteration of the first optimization process, the ECM may set optimization values for the plurality of adjustable parameters based on optimized values found for the first set of adjustable parameters according to the first optimization process. In some implementations, after each iteration of the second optimization process, the ECM may set the optimization values for the plurality of adjustable parameters based on optimized values found for the second set of adjustable parameters according to the second optimization process. In some implementations, the ECM may configure corresponding control devices associated with the plurality of adjustable parameters to operate within the power system using the optimization values to optimize performance features of the power system.

In some implementations, the ECM may determine that the first adjustable parameter of the first set of adjustable parameters is optimized based on a value of the first adjustable parameter not changing for a first number of iterations of the first optimization process and determine that the second adjustable parameter of the second set of adjustable parameters is optimized based on values of the second adjustable parameter not changing for a second number of iterations of the second optimization process. In some implementations, the first optimization process and the second optimization process are a same type of optimization process.

In some implementations, the power system includes an engine under operation and the first set of adjustable parameters includes at least one of a quantity of fuel injected into a cylinder of the engine, a timing of when the fuel is injected into the cylinder of the engine, or a pressure of the fuel that is to be injected into the cylinder of the engine. In some implementations, the second set of adjustable parameters includes at least one of: a pressure of air that enters the cylinder, a number of cylinders of the engine that are to receive fuel during operation, mass flow of an auxiliary regeneration device of an aftertreatment system of the power system, a position of an exhaust backpressure valve, a position of an intake throttle valve, a shot mode of the engine corresponding to a number of shots of fuel that are used to inject the fuel, an amount of time between shots of fuel into the cylinder in a multi-shot mode, and an amount of fuel per shot in a multi-shot mode.

In some implementations, one adjustable parameter of the first set of adjustable parameters is a same adjustable parameter as one adjustable parameter of the second set of adjustable parameters. In some implementations, after the first set of adjustable parameters are optimized according to the first optimization process, the ECM may configure a second control device, associated with a third adjustable parameter of the first set of adjustable parameters, to use an optimized value determined for the third adjustable parameter using the first optimization process.

Additionally, or alternatively, a process, as described herein, may include receiving measurements associated with one or more sensors. For example, the ECM (e.g., using power system optimizer module 230) may receive measurements associated with one or more sensors, as described above.

Such a process may include identifying settings associated with the one or more control devices. For example, the ECM (e.g., using power system optimizer module 230) may identify settings associated with one or more control devices, as described above.

Such a process may include determining that a first set of parameters associated with the one or more control devices is to be optimized according to a first optimization process. For example, the ECM (e.g., using power system optimizer module 230) may determine that a first set of parameters associated with the one or more control devices is to be optimized according to a first optimization process, as described above.

Such a process may include iteratively performing the first optimization process until the first set of parameters are optimized according to the first optimization process, wherein the first optimization process is performed based on the measurements associated with the one or more sensors. For example, the ECM (e.g., using power system optimizer module 230 and/or optimization mapping module 240) may iteratively perform the first optimization process until the first set of parameters are optimized according to the first optimization process. In some implementations, the first optimization process is performed based on the measurements associated with the one or more sensors.

Such a process may include determining that a second set of parameters associated with the one or more control devices are to be optimized according to a second optimization process. For example, the ECM (e.g., using power system optimizer module 230) may determine that a second set of parameters associated with the one or more control devices are to be optimized according to a second optimization process, as described above.

Such a process may include iteratively performing the second optimization process until the second set of parameters are optimized according to the second optimization process, wherein the second optimization process is performed based on the measurements associated with the one or more sensors and a first setting for a first control device of the one or more control devices, wherein the first setting for the first control device is an optimized value determined using the first optimization process. For example, the ECM (e.g., using power system optimizer module 230 and/or optimization mapping module 240) may iteratively perform the second optimization process until the second set of parameters are optimized according to the second optimization process, as described above. In some implementations, the second optimization process is performed based on the measurements associated with the one or more sensors and a first setting for a first control device of the one or more control devices. In some implementations, the first setting for the first control device is an optimized value determined using the first optimization process.

Such a process may include, after the second set of parameters are optimized according to the second optimization process, configuring a second control device of the one or more control devices to operate using an optimized value for the second control device determined using the second optimization process. For example, after the second set of parameters are optimized according to the second optimization process, the ECM (e.g., using power system optimizer module 230 and/or optimization mapping module 240) may configure a second control device of the one or more control devices to operate using an optimized value for the second control device determined using the second optimization process.

Such a process may include additional implementations, such as any single implementation or any combination of implementations described below and/or in connection with one or more other processes described herein.

In some implementations, the first set of parameters includes a same number of parameters as the second set of parameters. In some implementations, the ECM may randomly select the second set of parameters from a plurality of parameters associated with the one or more control devices. In some implementations, the plurality of parameters are designated to be optimized after the first set of parameters are optimized using the first optimization process.

In some implementations, the first set of parameters are optimized using the first optimization process when a threshold number of parameters of the first set of parameters are found to have a same value after a first number of iterations. In some implementations, the threshold number of parameters corresponds to all parameters in the first set of parameters.

Additionally, or alternatively, a process, as described herein, may include identifying a first parameter of a plurality of parameters that is to be optimized during operation of an engine of a power system. For example, the ECM (e.g., using power system optimizer module 230) may identify a first parameter of a plurality of parameters that is to be optimized during operation of an engine of a power system, as described above.

Such a process may include selecting a first set of parameters to be optimized according to a first optimization process based on characteristics of each of the first set of parameters, wherein the first set of parameters includes the first parameter. For example, the ECM (e.g., using power system optimizer module 230) may select a first set of parameters to be optimized according to a first optimization process based on characteristics of each of the first set of parameters, as described above. In some implementations, wherein the first set of parameters includes the first parameter.

Such a process may include iteratively performing the first optimization process until each of the first set of parameters is optimized. For example, the ECM (e.g., using power system optimizer module 230 and/or optimization mapping module 240) may iteratively perform the first optimization process until each of the first set of parameters is optimized, as described above.

Such a process may include configuring a first control device to operate based on an optimized value, for at least one of the first set of parameters, determined using the first optimization process. For example, the ECM (e.g., using power system optimizer module 230 and/or optimization mapping module 240) may configure a first control device to operate based on an optimized value, for at least one of the first set of parameters, determined using the first optimization process, as described above.

Such a process may include, after the first set of parameters is optimized, selecting a second set of parameters to be optimized according to a second optimization process, wherein the second set of parameters includes the first parameter. For example, after the first set of parameters is optimized, the ECM (e.g., using power system optimizer module 230) may select a second set of parameters to be optimized according to a second optimization process, as described above. In some implementations, the second set of parameters includes the first parameter.

Such a process may include iteratively performing the second optimization process until each of the second set of parameters is optimized. For example, the ECM (e.g., using power system optimizer module 230 and/or optimization mapping module 240) may iteratively perform the second optimization process until each of the second set of parameters is optimized, as described above.

Such a process may include configuring a second control device to operate based on an optimized value, for at least one of the second set of parameters, determined using the second optimization process. For example, the ECM (e.g., using power system optimizer module 230) may configure a second control device to operate based on an optimized value, for at least one of the second set of parameters, determined using the second optimization process, as described above.

Such a process may include additional implementations, such as any single implementation or any combination of implementations described below and/or in connection with one or more other processes described herein.

In some implementations, the first parameter comprises a quantity of fuel injected into a cylinder of the engine during operation. In some implementations, the first set of parameters includes a same number of parameters as the second set of parameters. In some implementations, the first control device and the second control device are a same control device and the optimized value, for the at least one of the second set of parameters, is greater than or less than the optimized value for the at least one of the first set of parameters. In some implementations, a second parameter, of the second set of parameters, is randomly selected, from the plurality of parameters, to be optimized using the second optimization process. In some implementations, the first parameter is designated to be optimized using the second optimization process. In some implementations, the second parameter is different than the first parameter.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

An engine can be a complex system. There are multiple parameters that can impact one or more performance features of the engine. For example, such performance features may include fuel consumption, transient response, torque delivered vs. torque desired, and/or the like. Some parameters may be adjustable (e.g., timing, fuel quantity, fuel injection pressure, EGR flow, boost pressure (air intake pressure), and/or the like). Some parameters are not adjustable (e.g., ambient conditions, exhaust restrictions, and/or the like). An ECM may be configured to optimize a fixed set of parameters. As such, though a set of parameters may have been found to be optimized, because the set of parameters that are to be optimized is fixed, the ECM may continue to attempt to optimize the set of parameters. In such cases, the ECM may waste resources (e.g., processing resources, power resources, and/or the like) attempting to optimize the parameters because the optimized values for the fixed set of parameters have already been found.

According to some implementations described herein, a power system optimization is performed that allows an ECM to optimize as many adjustable parameters as possible during operation. As described herein, variable sets of parameters can be optimized at a given time, allowing for an increased number of parameters to be optimized relative to previous techniques. In some implementations, an ECM may iteratively perform an optimization process every threshold period of time (e.g., 400 ms) to optimize a set of parameters to enhance one or more performance features of the engine. As such, as described herein, a number of parameters that are to be optimized by an iteratively performed optimization process may be limited to a particular number (e.g., four or less, five or less, six or less, and/or the like) to ensure a strong sampling during the optimization process while being able to find optimized values for a plurality of parameters relatively quickly. Further, as described herein, a performance optimization may be iteratively performed until a set of parameters that are being optimized have been found to be optimized (e.g., by finding an optimized value). Once the set of parameters are determined to be optimized, a subsequent set of parameters are selected for a subsequent performance optimization. In such cases, the optimized values found by the previous performance optimization may be used to find optimized values for the parameters that are to be optimized by the subsequent performance optimization.

In some implementations, certain parameters may be designated for optimization according to a priority system. For example, certain parameters may be configured to always be optimized, to be initially optimized, to be optimized after other parameters, to be optimized when possible, and/or to be optimized according to any other priority designation. As such, a system can be configured to ensure that at least one parameter (e.g., fuel quantity, timing, and/or the like) is always being optimized, while other parameters can be optimized along with the fuel quantity according to a prioritization scheme. As such, power system optimization techniques, as described herein, can enable multiple, various performance features to be optimized.

Accordingly, as described herein, one or more processes and/or techniques for power system optimization may enable optimized performance of various performance features by iteratively selecting and optimizing various sets of parameters. Further, as the power system optimization is performed over time, as described herein, more and more parameters (and more and more combinations of parameters) can be optimized, allowing for all performance features, or at least as various sets or various numbers of sets performance features (rather than a fixed set or fixed number of features), to be optimized according to the optimization processes described herein. As such, various costs (e.g., fuel costs, emissions, and/or the like) and/or resources (e.g., processing resources, power resources, and/or the like) associated with operating an engine can be conserved relative to previous techniques.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A power system comprising:
   an engine under operation;
   a memory; and
   one or more processors configured to:
   identify a plurality of adjustable parameters to control a power system;
   identify a plurality of non-adjustable parameters associated with the power system;
   determine that a first set of adjustable parameters, of the plurality of adjustable parameters, is to be optimized according to a first optimization process;
   iteratively perform the first optimization process until the first set of adjustable parameters is optimized according to the first optimization process,
   wherein the first optimization process is performed based on values of the plurality of non-adjustable parameters;
   after the first set of adjustable parameters is optimized according to the first optimization process, select a second set of adjustable parameters, of the plurality of adjustable parameters, to be optimized according to a second optimization process;
   iteratively perform the second optimization process until the second set of adjustable parameters are optimized according to the second optimization process; and after the second set of adjustable parameters are optimized according to the second optimization process, configure a first control device, associated with a first adjustable parameter of the first set of adjustable parameters or a second adjustable parameter of the second set of adjustable parameters to use an optimized value determined for the first adjustable parameter using the first optimization process or an optimized value determined for the second adjustable parameter according to the second optimization process, wherein the first set of adjustable parameters identifies at least one of a quantity of fuel injected into a cylinder of the engine, a timing of when the fuel is injected into the cylinder of the engine, or a pressure of the fuel that is to be injected into the cylinder of the engine, and wherein the second set of adjustable parameters identifies at least one of:
 a pressure of air that enters the cylinder,
 a number of cylinders of the engine that are to receive fuel during operation,
 mass flow of an auxiliary regeneration device of an aftertreatment system of the power system,
 a position of an exhaust backpressure valve,
 a position of an intake throttle valve,
 a shot mode of the engine corresponding to a number of shots of fuel that are used to inject the fuel,
 an amount of time between shots of fuel into the cylinder in a multi-shot mode, and
 an amount of fuel per shot in a multi-shot mode.

2. The power system of claim 1, wherein the plurality of adjustable parameters are settings for corresponding control devices of the power system, and the plurality of non-adjustable parameters are received from one or more sensors of the power system.

3. The power system of claim 1, wherein the one or more processors are further configured to determine that the first set of adjustable parameters are to be optimized based on optimization characteristics of the first set of adjustable parameters.

4. The power system of claim 1, wherein each iteration of the first optimization process includes iteratively adjusting values of the first set of adjustable parameters to identify the optimized value determined for the first adjustable parameter using the first optimization process,
 wherein each iteration of the second optimization process includes iteratively adjusting values of the second set of adjustable parameters to identify the optimized value determined for the second adjustable parameter using the second optimization process, and
 wherein the optimized value determined for the second adjustable parameter using the second optimization process comprises a minimum cost function value for the second optimization process.

5. The power system of claim 1, wherein the one or more processors are further configured to:
 after each iteration of the first optimization process, set optimization values for the plurality of adjustable parameters based on optimized values found for the first set of adjustable parameters according to the first optimization process;
 after each iteration of the second optimization process, set the optimization values for the plurality of adjustable parameters based on optimized values found for the second set of adjustable parameters according to the second optimization process; and configure corresponding control devices associated with the plurality of adjustable parameters to operate within the power system using the optimization values to optimize performance features of the power system.

6. The power system of claim 1, wherein the one or more processors are further configured to:
 determine that the first adjustable parameter of the first set of adjustable parameters is optimized based on a value of the first adjustable parameter not changing for a first number of iterations of the first optimization process; and
 determine that the second adjustable parameter of the second set of adjustable parameters is optimized based on values of the second adjustable parameter not changing for a second number of iterations of the second optimization process.

7. The power system of claim 1, wherein the first optimization process and the second optimization process are a same type of optimization process.

8. The power system of claim 1, wherein one adjustable parameter of the first set of adjustable parameters is a same adjustable parameter as one adjustable parameter of the second set of adjustable parameters.

9. The power system of claim 1, wherein the one or more processors are further configured to:
 after the first set of adjustable parameters are optimized according to the first optimization process, configure a second control device, associated with a third adjustable parameter of the first set of adjustable parameters, to use an optimized value determined for the third adjustable parameter using the first optimization process.

10. A power system comprising:
 an engine;
 one or more control devices;
 one or more sensors; and
 an engine control module configured to:
  receive measurements associated with the one or more sensors;
  identify settings associated with the one or more control devices;
  determine that a first set of parameters associated with the one or more control devices is to be optimized according to a first optimization process;
  iteratively perform the first optimization process until the first set of parameters are optimized according to the first optimization process,
   wherein the first optimization process is performed based on the measurements received from the one or more sensors;
  determine that a second set of parameters associated with the one or more control devices are to be optimized according to a second optimization process;
  iteratively perform the second optimization process until the second set of parameters are optimized according to the second optimization process,
   wherein the second optimization process is performed based on the measurements received from the one or more sensors and a first setting for a first control device of the one or more control devices,
   wherein the first setting for the first control device is an optimized value determined using the first optimization process; and
  after the second set of parameters are optimized according to the second optimization process, configure a second control device of the one or more control devices to operate using an optimized value for the second control device determined using the second optimization process.

11. The power system of claim 10, wherein the first set of parameters includes a same number of parameters as the second set of parameters.

12. The power system of claim 10, wherein the engine control module is further configured to randomly select the second set of parameters from a plurality of parameters associated with the one or more control devices,
wherein the plurality of parameters are designated to be optimized after the first set of parameters are optimized using the first optimization process.

13. The power system of claim 10, wherein the first set of parameters are optimized using the first optimization process when a threshold number of parameters of the first set of parameters are found to have a same value after a first number of iterations.

14. The power system of claim 13, wherein the threshold number of parameters corresponds to all parameters in the first set of parameters.

15. A method comprising:
identifying, by an engine control module, a first parameter, of a plurality of parameters, that is to be optimized during operation of an engine of a power system;
selecting, by the engine control module, a first set of parameters to be optimized according to a first optimization process,
wherein the first set of parameters includes the first parameter;
iteratively performing, by the engine control module, the first optimization process until the first set of parameters is optimized;
configuring, by the engine control module, a first control device to operate based on an optimized value, for at least one of the first set of parameters, determined using the first optimization process;
after the first set of parameters is optimized, selecting, by the engine control module, a second set of parameters to be optimized according to a second optimization process,
wherein the second set of parameters includes the first parameter;
iteratively performing, by the engine control module, the second optimization process until the second set of parameters is optimized; and
configuring, by the engine control module, a second control device to operate based on an optimized value, for at least one of the second set of parameters, determined using the second optimization process.

16. The method of claim 15, wherein the first parameter comprises a quantity of fuel injected into a cylinder of the engine during operation.

17. The method of claim 15, wherein the first set of parameters includes a same number of parameters as the second set of parameters.

18. The method of claim 15, wherein the first control device and the second control device are a same control device and the optimized value, for the at least one of the second set of parameters, is greater than or less than the optimized value for the at least one of the first set of parameters.

19. The method of claim 15, wherein a second parameter, of the second set of parameters, is randomly selected, from the plurality of parameters, to be optimized using the second optimization process,
wherein the first parameter is designated to be optimized using the second optimization process, and
wherein the second parameter is different than the first parameter.

* * * * *